(12) United States Patent
Qahouq

(10) Patent No.: US 9,368,991 B2
(45) Date of Patent: Jun. 14, 2016

(54) DISTRIBUTED BATTERY POWER ELECTRONICS ARCHITECTURE AND CONTROL

(71) Applicant: Board of Trustees of The University of Alabama, Tuscaloosa, AL (US)

(72) Inventor: Jaber Abu Qahouq, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 149 days.

(21) Appl. No.: 14/066,839

(22) Filed: Oct. 30, 2013

(65) Prior Publication Data

US 2014/0125284 A1    May 8, 2014

Related U.S. Application Data

(60) Provisional application No. 61/720,103, filed on Oct. 30, 2012.

(51) Int. Cl.
    *H02J 7/00*    (2006.01)

(52) U.S. Cl.
    CPC ............ *H02J 7/0065* (2013.01); *H02J 7/0011* (2013.01); *H02J 7/0018* (2013.01)

(58) Field of Classification Search
    CPC ...... H02J 7/0065; H02J 7/0018; H02J 7/0011
    See application file for complete search history.

(56) References Cited

U.S. PATENT DOCUMENTS 5,850,136 A    12/1998  Kaneko
5,959,432 A *  9/1999   Saurer et al. ................. 320/101
6,472,847 B2 * 10/2002  Lundberg ...................... 320/132
6,876,174 B1 * 4/2005   Samittier Marti et al. ..... 320/132
7,965,061 B2   6/2011   Li et al.
7,989,977 B2   8/2011   Crane
8,053,929 B2 * 11/2011  Williams et al. ................ 307/82
8,115,446 B2   2/2012   Piccard et al.
8,154,151 B2   4/2012   King et al.

(Continued)

FOREIGN PATENT DOCUMENTS

JP        10191574        7/1998

OTHER PUBLICATIONS

International Search Report and Written Opinion, dated Feb. 14, 2014, received in connection with corresponding International Application No. PCT/US2013/067403.

*Primary Examiner* — Naum B Levin
(74) *Attorney, Agent, or Firm* — Meunier Carlin & Curfman LLC

(57) ABSTRACT

A battery pack having a plurality of battery pack modules, wherein each battery pack module includes a battery cell and a power converter. The power converters of the plurality of battery pack modules are connected in series to form a string of N battery pack modules such that the voltage across the N battery pack modules defines the output voltage of the battery pack. A controller regulates the output voltage of each battery cell or module power converter and the output voltage of the battery pack by independently controlling each battery cell module in accordance with variables such as state-of-charge (SOC), state-of-health (SOH) and temperature, capacity, and temperature of each individual battery cell module. The power converter may be used to measure impedance of the battery pack by adding a sinusoidal perturbation signal to a reference voltage of the cell battery pack module.

19 Claims, 15 Drawing Sheets

(56) References Cited

U.S. PATENT DOCUMENTS

| | | | |
|---|---|---|---|
| 8,248,032 B2 * | 8/2012 | Ozeki et al. | 320/124 |
| 8,269,372 B2 * | 9/2012 | Kim et al. | 307/72 |
| 8,339,112 B2 * | 12/2012 | Rua et al. | 323/222 |
| 8,542,509 B2 * | 9/2013 | Sagneri et al. | 363/69 |
| 8,617,745 B2 * | 12/2013 | Gozdz et al. | 429/231.9 |
| 8,754,543 B2 * | 6/2014 | Svensson et al. | 307/46 |
| 8,760,122 B2 * | 6/2014 | Demetriades | 320/136 |
| 9,013,151 B2 * | 4/2015 | Tabuchi et al. | 320/132 |
| 2005/0001593 A1 | 1/2005 | Kawasumi et al. | |
| 2006/0152085 A1 | 7/2006 | Flett et al. | |
| 2008/0191663 A1 | 8/2008 | Fowler et al. | |
| 2008/0278115 A1 * | 11/2008 | Huggins | 320/134 |
| 2010/0133911 A1 * | 6/2010 | Williams et al. | 307/82 |
| 2010/0264740 A1 | 10/2010 | Lee | |
| 2011/0089763 A1 * | 4/2011 | Svensson et al. | 307/80 |
| 2011/0156714 A1 | 6/2011 | Mizoguchi et al. | |
| 2012/0194133 A1 | 8/2012 | Posamentier et al. | |
| 2012/0319652 A1 * | 12/2012 | Namou et al. | 320/116 |

\* cited by examiner

DISTRIBUTED BATTERY POWER ELECTRONICS ARCHITECTURE AND CONTROL

CROSS-REFERENCE TO RELATED APPLICATION

This application claims priority to U.S. Provisional Patent Application No. 61/720,103, filed Oct. 30, 2012, entitled "DISTRIBUTED BATTERY POWER ELECTRONICS ARCHITECTURE AND CONTROL," which is incorporated herein by reference in its entirety.

BACKGROUND

Conventional approaches to battery pack design typically separate the architecture and control of the battery pack from the DC-DC power converter design, architecture and control. The DC-DC converter is used for voltage regulation to the rest of the system or to the load, e.g. to the power inverter that drives the vehicle motor. This results in additional electronic circuits to monitor battery health and faults and balance different battery cells in the battery pack, and in the inability to effectively decouple battery cells performances from each other. A conventional battery pack may have N cells connected in series in a string. Several strings could also be connected in parallel to achieve higher capacity. Each cell or combination of cells has electronic circuit and a Balancing Circuit (B.C.) in order to perform a cell charge balancing function. A balancing controller controls the operation of these balancing circuits in order to try to maintain equal State-Of-Charge (SOC) for the cells. Larger number of balancing circuits for larger number of cells results in higher cost and complexity. A balancing controller utilizes the SOC information to control the balancing circuits for equal SOC. The BC is provided to accommodate non-uniform aging of the cells, non-uniform performance degradation, and non-uniform discharge/discharge in order to achieve battery pack with longer operational life and better performance.

The battery pack output voltage supplies a DC-DC power converter in order to regulate the voltage which will be used as an input to the rest of the system or to the load. A controller measures the DC-DC power converter voltages and currents in order to provide control signals for proper operation. In the conventional battery pack, a degraded cell could impact the whole battery pack performance, resulting in shorting the other cells life and generating additional heat. The balancing circuits and controller could partially take care of this issue if the mismatch between cells is within a limited range. However, a very bad cell (or cells) will result in balancing circuits to keep passing charges between cells which causes additional power losses and heat, eventually leading to overall battery pack degradation (i.e., a worse State-Of-Health, SOH). This affects both the battery pack discharging operation mode and charging operation mode.

Conventionally, there are several methods that can be used to estimate SOC. The cell Open Circuit Voltage (OCV) is a parameter that could be used, either alone or as one of the variables used in a more complicated scheme. Therefore, the determination of the OCV affects the accuracy of the SOC estimation. While it is possible to estimate the OCV by measuring the cell voltage at different cell current values and with the knowledge of the cell impedance, this method does not have good accuracy because it requires the accurate knowledge of the cell impedance and because this impedance value might be affected for different current values, different temperatures, different cells, and as non-uniform aging of cells. This makes the accurate estimation of the OCV during the system operation difficult and inaccurate, and it requires additional electronic circuits and controller.

Conventionally, there are several methods that could be used to determine SOH. An estimate of the cell impedance (Zcell) change is a characteristic of these methods. One fairly complex method to estimate the complete impedance (and not only the DC resistance) involved the application of a periodic time-varying (e.g. sinusoidal) small voltage or current and measuring the corresponding current or voltage, respectively. By using Ohm's Law and the phase shift between the voltage and current, the impedance value can be calculated. However, this method requires added circuits to apply the time-varying signal, which increase complexity and cost.

SUMMARY

In accordance with some implementations described herein, there is provided a battery pack that includes a plurality of battery pack modules, where each battery pack module has a battery cell and its own power converter. The battery pack further includes a controller that regulates an output voltage of the battery pack by individually controlling each battery pack module. The power converters of the plurality of battery pack modules are connected in series to form a string of N battery pack modules, and the voltage across the N battery pack modules defines the output voltage of the battery pack.

In accordance with aspects of the present disclosure, there is described a battery pack that includes a plurality of battery pack modules, where battery pack module includes a battery cell, a power converter and a controller that regulates an output voltage of the battery pack. Power converters of the plurality of battery pack modules are connected in series to form a string of N battery pack modules and each battery pack module is independently controlled. The voltage across the N battery pack modules defines the output voltage of the battery pack.

In accordance with other aspects of the present disclosure, there is provided a method of controlling a battery pack using a controller that regulates an output voltage of the battery pack. The method includes determining a battery pack voltage reference value by the controller in a constant voltage mode; determining an initial voltage reference value for each battery pack module by dividing the battery pack voltage reference value by a number of active battery pack modules in the battery pack; and using the initial voltage reference value for each battery pack module to regulate an output voltage of a respective battery pack module.

In accordance with yet other aspects of the present disclosure, there is provided a method of controlling a battery pack using a controller that regulates an output voltage of the battery pack. The method includes determining a battery pack current reference value is determined by the controller in a constant current mode; determining an initial current reference value for each battery pack module by dividing the battery pack current reference value by a number of active battery pack modules in the battery pack; and using the initial current reference value for each battery pack module to regulate an output current of a respective battery pack module.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative implementations, is better understood when read in conjunction with the appended drawings. For the purpose of illustrating the implementations, there are shown in the drawings example constructions; however, the implementations are not limited to the specific methods and instrumentalities disclosed. In the drawings.

DETAILED DESCRIPTION

Figure 1:
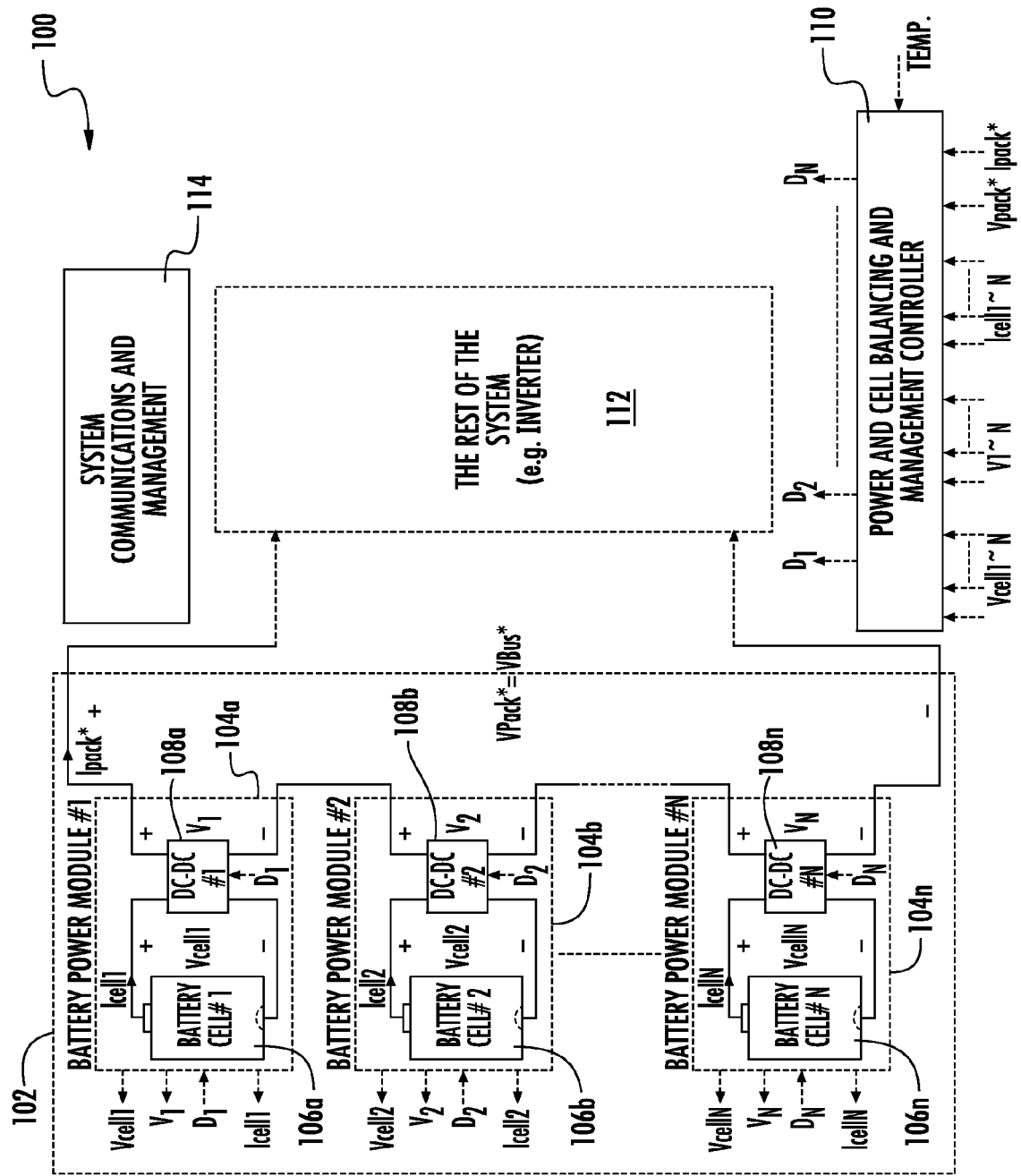
FIG. 1 illustrates a block diagram of an example energy storage system of the present disclosure.

With reference to the accompanying figures, FIG. 1 illustrates a block diagram of an example energy storage system 100 of the present disclosure. As shown in FIG. 1, a battery pack 102 includes plural battery pack modules 104a ... 104n, each having an associated battery cell 106a ... 106n and DC-DC power converter 108a ... 108n. In accordance with FIG. 1, the outputs of the DC-DC power converters 108a ... 108n are connected in series, thus decoupling the battery cells 106a ... 106n from each other. This forms a string of several Battery Power Modules (BPMs) 104a ... 104n, where each module consists of a battery cell and an open-loop DC-DC power converter within itself, i.e., the converter has no independent closed-loop control from the other converters but its current and voltage information is sensed and fed to an external controller as shown in FIG. 1. Several strings could also be connected in parallel if desired.

The DC-DC power converters 108a ... 108n each regulate the total battery pack voltage, and are typically smaller than the larger conventional power converter. The power converters 108a ... 108n are used to symmetrically and asymmetrically regulate the voltage of each battery cell 106a ... 106n such that the total output voltage of the battery pack 102 is regulated. The DC-DC power converters 108a ... 108n are used to perform control functions, as will be discussed below, such as cell balancing monitoring, real-time online cell impedance measurement, and voltage regulation. As such, there is no need for additional circuitries in order to realize these functions. Optionally or additionally, more than one cell may be provided in series or in parallel per one power converter.

A controller 110 outputs control signals (e.g., duty cycles D1 through DN) to the DC-DC power converters 108a ... 108n of the BPMs 104a ... 104n to perform functions such as regulating the output voltage of the battery pack 102 (VPack) such that it equals a bus voltage (VBus) provide to the system 112 by regulating output voltages V1 through VN of the BPMs 104a ... 104n, regulating a charge/discharge rate of each individual cell 106a ... 106n to maintain desired SOC and based on the cell's SOH, and estimating variables such as Zcell and OCV in order to estimate SOC and SOH for early fault detection.

Figure 2:
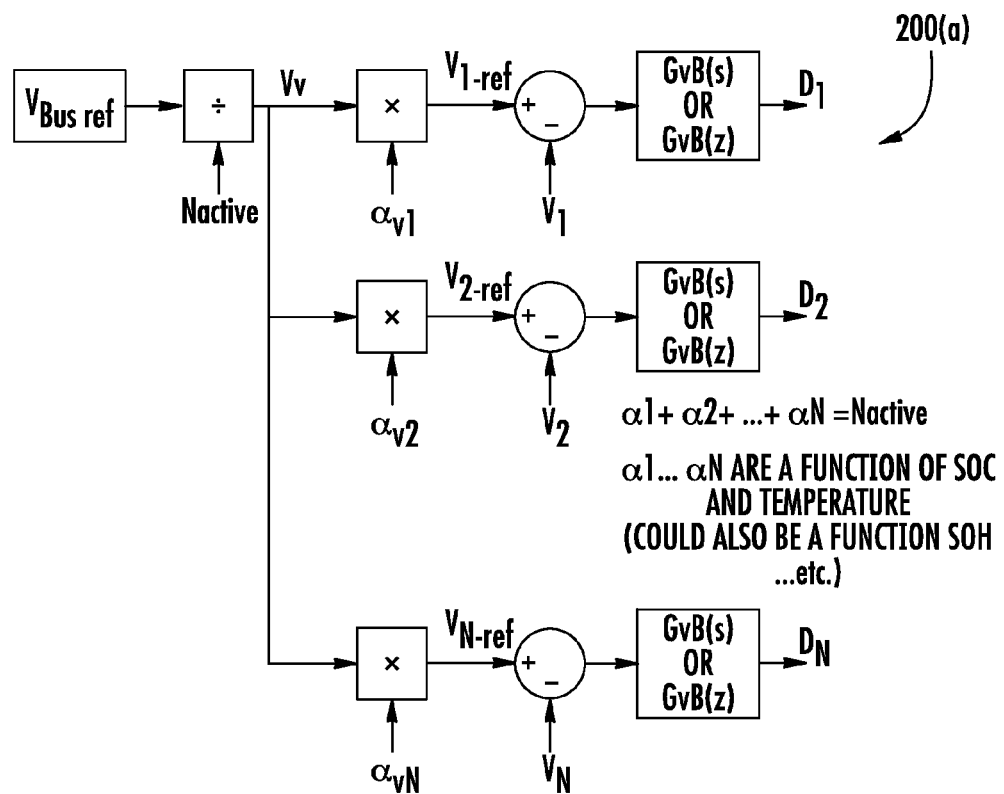
FIGS. 2-3 illustrate a block diagram of a voltage-loop controller performing a discharge mode of operation within the energy storage system of FIG. 1.
Figure 3:
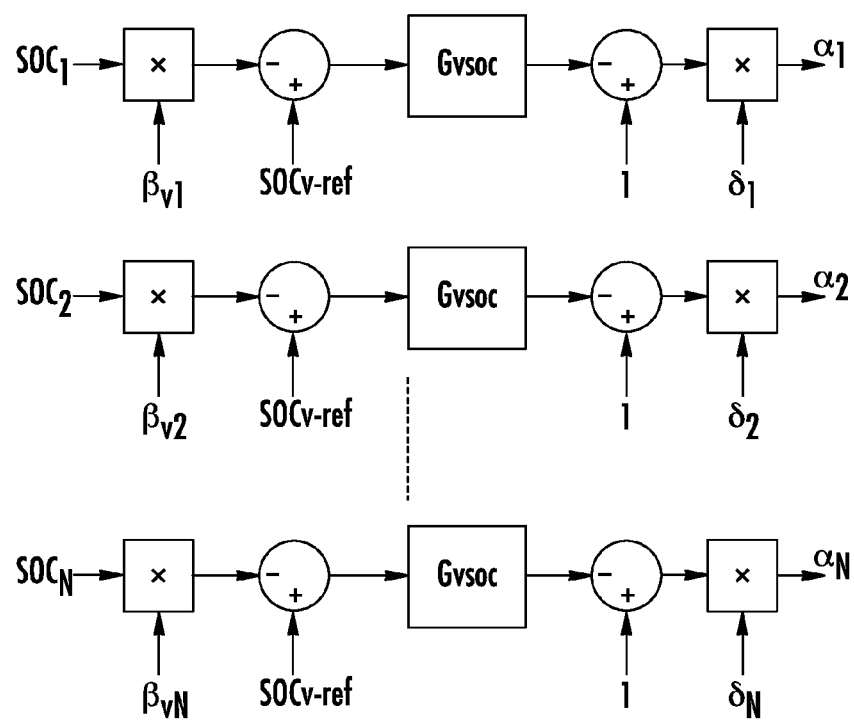

FIGS. 2-3 illustrate block diagrams of a basic control loop 200(a) and 200(b) that may be used in the energy storage system of FIG. 1. A battery pack voltage reference value (VBus-ref) may be specified that is used to derive the initial reference voltages for each BPM 104a ... 104n (e.g., V1-ref through VN-ref). For example, V1-ref through VN-ref may be determined by dividing VBus-ref by a number of active battery cells 106a ... 106n (or BPMs 104a ... 104n) in the battery pack string. This number may be specified as Nactive, where Nactive=N when δ1=δ2= ... =δN=1 because Nactive=(N −(1-δ1)−(1-δ2)− ... −(1-δN)).

In accordance with the system of FIG. 1, the battery pack voltage is also the bus voltage to the rest of the system. These reference values are used in a closed control loop as shown in FIG. 2 in order to regulate the output voltage for each BPM. When the voltage loop multipliers $\alpha v1 = \alpha v2 \ldots \alpha vN = 1$, the output voltages of the BPMs (V1 through VN) are equal and their sum is equal to VPack=VBus. The output of each BMP can be made different by making its multiplier value different, however, while keeping $\alpha v1 + \alpha v2 + \ldots + \alpha vN$=Nactive such that VPack is always equal to VBus-ref. The controller compensation transfer function GvB(s) or GvB(z) in FIG. 2 can be a PI type or a PID type (P: Proportional, I: Integral, D: Derivative).

The voltage loop multiplier values $\alpha v1 = \alpha v2 \ldots \alpha vN$ output from 200(b) can be adjusted in order to control the cells SOC values (SOC1 through SOCN) as illustrated in FIG. 3. The SOC values of the cells are compared to a reference value (SOCv-ref) in order to maintain symmetric SOC values (naturally perform cell balancing) assuming that the SOH of all cells is the same. The value of a is relatively smaller when the battery cell has a higher charge, and relatively larger for when the battery cell has a lower charge. This SOC reference values is generated by adding all SOC values of the cells as shown in FIG. 3 when the SOC loop multipliers $\beta v1 = \beta v2 = \ldots = \beta vN = 1$, the Enable/Disable multipliers $\delta1 = \delta2 = \ldots = \delta N = 1$, and dividing the sum by the number of active cells, Nactive. Thus, a relationship may be defined, as follows:

$$SOCv\text{-}ref = (\beta v1 \times \delta 1 \times SOC1 + \beta v2 \times \delta 2 \times SOC2 + \ldots + \beta vN \times \delta N \times SOCN)/Nactive \quad (1)$$

If a cell SOC value is smaller or larger than the reference (i.e. the other cells' SOC values), this will affect its voltage loop multiplier value ($\alpha vr$, $r=1, 2 \ldots N$). As shown in FIG. 2, because the voltage loop multiplier value is an input to a multiplier associated with each BPM, the voltage loop multiplier value will affect the reference voltage of that specific cell BPM. Because the output current of all BPMs 104a ... 104n in the same string is the same, this difference in the voltage will affect the discharge or charge rate of that specific cell because a BPM output power in this case is a function of the BPM output voltage for the same current. This will continue until all cells SOC values are equal and the cells are balanced. Thus, adjusting the voltage of a BMP while maintaining the total battery pack voltage regulated provides a mechanism to control the energy drawn from any particular battery cell 106a . . . 106n, which controls the discharge or change rate of the cell. This control concept results in charge balance control, and therefore there is no need for additional balancing circuits to transfer charges between the cells. In FIG. 3, GvSOC can be a proportional type compensator (DC gain), such as a low pass filter.

The SOC loop multipliers, shown in 200(*b*) as βv1 . . . βvN, may be used to control the desired SOC for a specific cell in order to make the SOC or discharge/charge rate of a cell or larger or smaller than the rest of the cells. Each SOC loop multiplier βv1 . . . βvN may be any value, and may be determined as a function of the cell SOH. If the multiplier value is larger, the control loop will behave as if the associated cell has higher SOC than actually it has, and therefore it will discharge the cell at slower rate, and vice versa. Additionally or optionally, the multiplier βv1 . . . βvN may be used to prevent a cell voltage from going below a given limit during discharge if the voltage of that cell is decreasing at faster rate, or from going above a given limit during charge if the voltage of that cell is increasing at faster rate. Additionally or optionally, the multiplier βv1 . . . βvN may be used to prevent a cell from excessive heating as part of a temperature control/thermal management scheme.

In accordance with some implementations, the multipliers δ1 through δN provided to 200(*b*) may have values of either 1 or 0 in order to enable or disable a BPM control. For example, BPM control may be disabled if a BPM is removed from the battery pack.

Battery Pack System Charging

Figure 4:
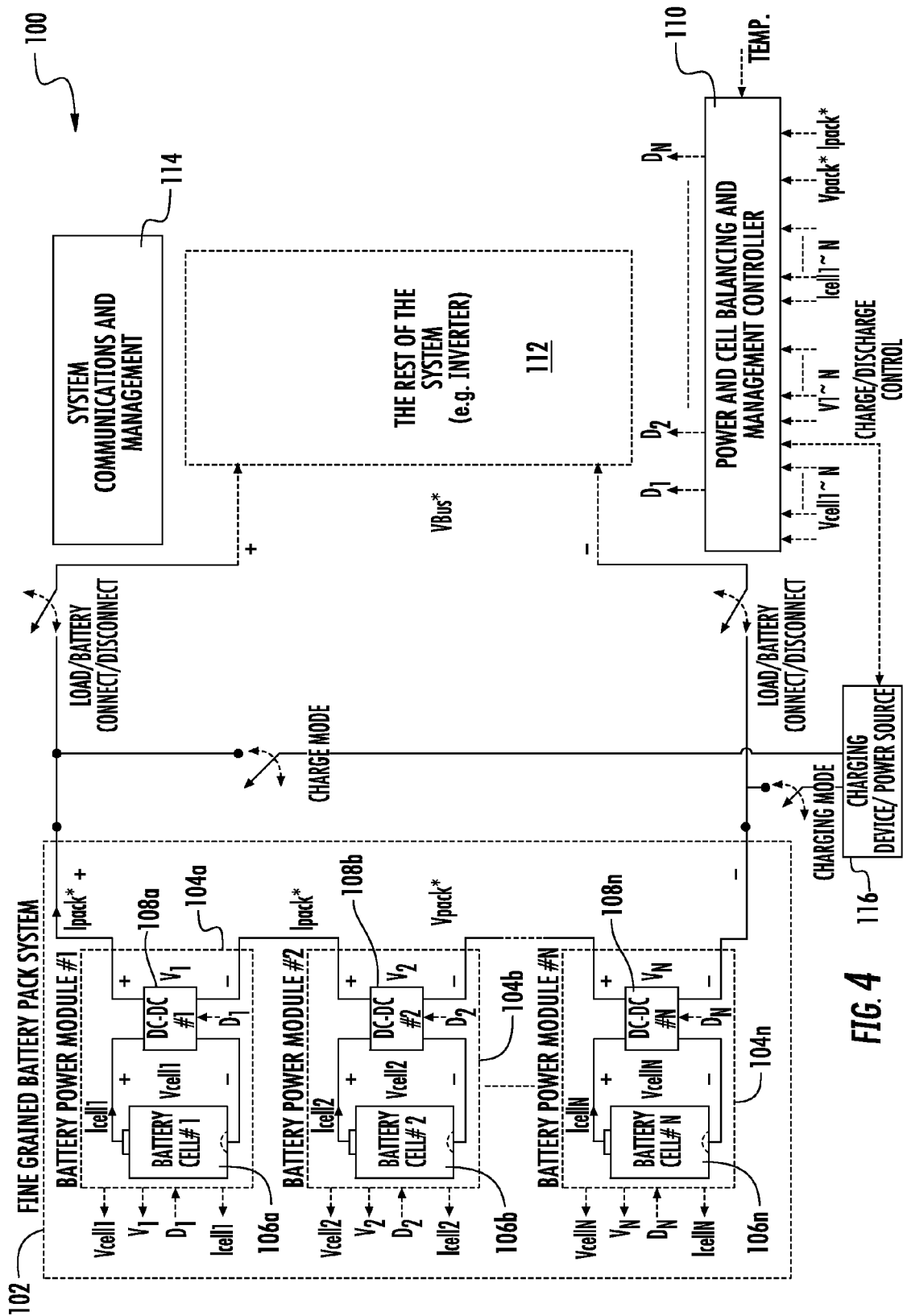
FIG. 4 is a block diagram of the example energy storage system of FIG. 1 with a charging source.

FIG. 4 shows the simplified block diagram of the energy storage system of FIG. 1 with a charging operation. A DC voltage may be applied across the battery pack system terminals using a charging source 116. Since the power converter 108a . . . 108n used in each BPM 104a . . . 104n is bidirectional, the power converter 108a . . . 108n in each BPM may be used to charge its corresponding battery cell 106a . . . 106n. While under a discharge operation each DC-DC power converter 108a . . . 108n operates in voltage step-up mode (boost mode), whereas during a charging operation the power converter 108a . . . 108n operates in step-down mode (buck mode). Note that in this case the voltage of the bidirectional DC-DC power converter at the battery cell side is lower than it is at the other side of the power converter (which also means that the current at the battery cell side is higher than it is at the other side of the power converter). In accordance with the present disclosure, a variety of DC-DC power converter topologies, isolated and non-isolated, that could be used.

Figure 5:
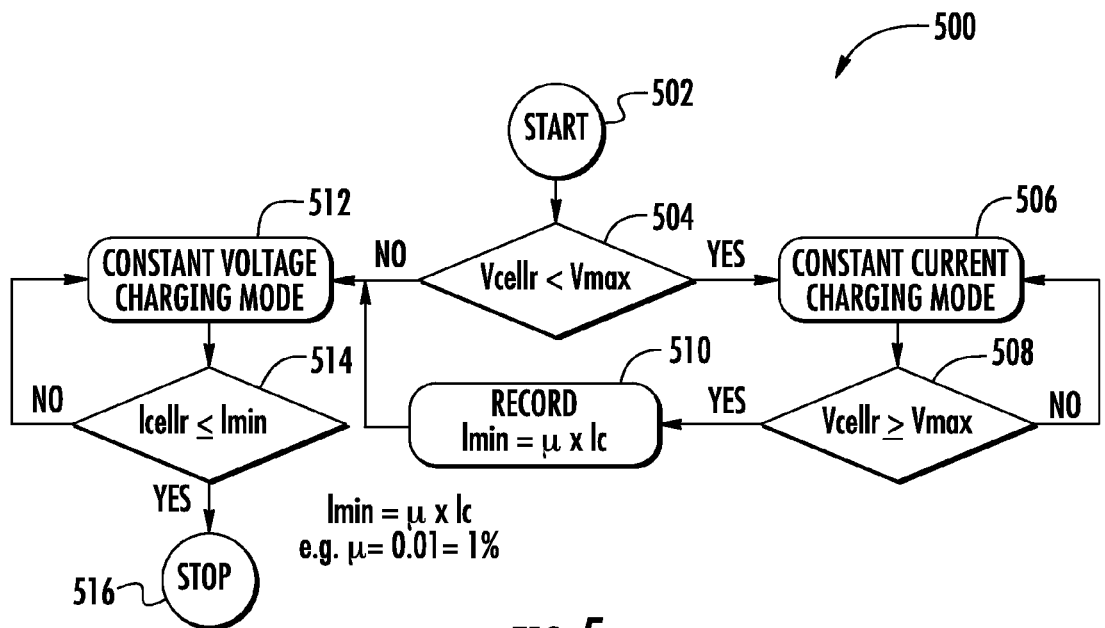
FIG. 5 illustrates a simplified charging controller operational flow that may be performed by the controller of FIG. 1.

FIG. 5 shows a simplified charging controller operational flow 500 that may be performed by the controller 110. At 502, the flow begins. At 504, it is determined if the cell voltage (Vcellr) is less than a maximum cell value (Vmax). If Vcellr is less than Vmax, then at 506, a constant current charging mode (CCCM) is performed. At 508, it is determined if the cell voltage Vcellr has reached the maximum cell value Vmax. If not, then the CCCM continues to be performed. If the cell voltage Vcellr has reached the maximum cell value Vmax, then at 510, the minimum cell current (Imin) is determined and recorded in accordance as a percentage of cell current capacity (e.g., Imin=μ×Ic, where μ is the desired minimum percentage (e.g., 1%)). Next, the process moves to 512, where the controller 110 operates in a constant voltage charging mode (CVCM). At 514, it is determined if cell current Icellr is less than the mini until the current drops below Imin. If yes, then the process stops at 516. It not, then the CVCM is performed by the controller 110.

Figure 6:
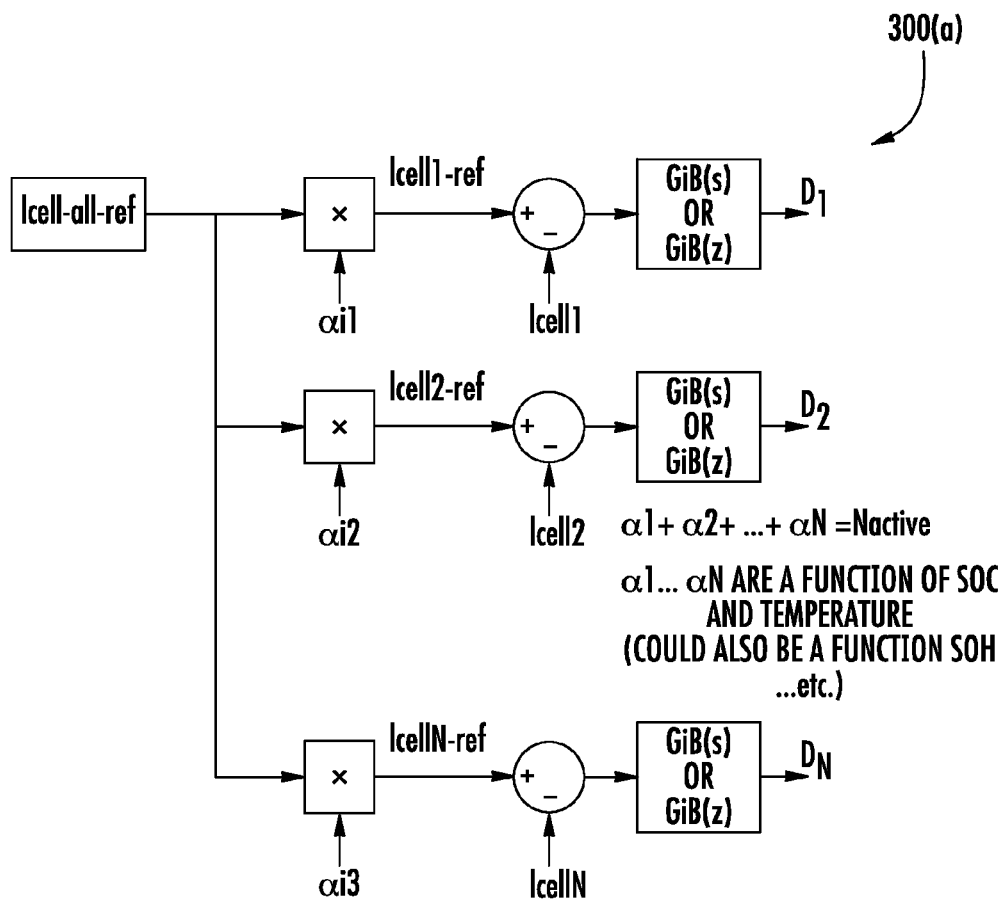
FIGS. 6-7 illustrate a block diagram of a constant current charging mode controller within the energy storage system of FIG. 1.
Figure 7:
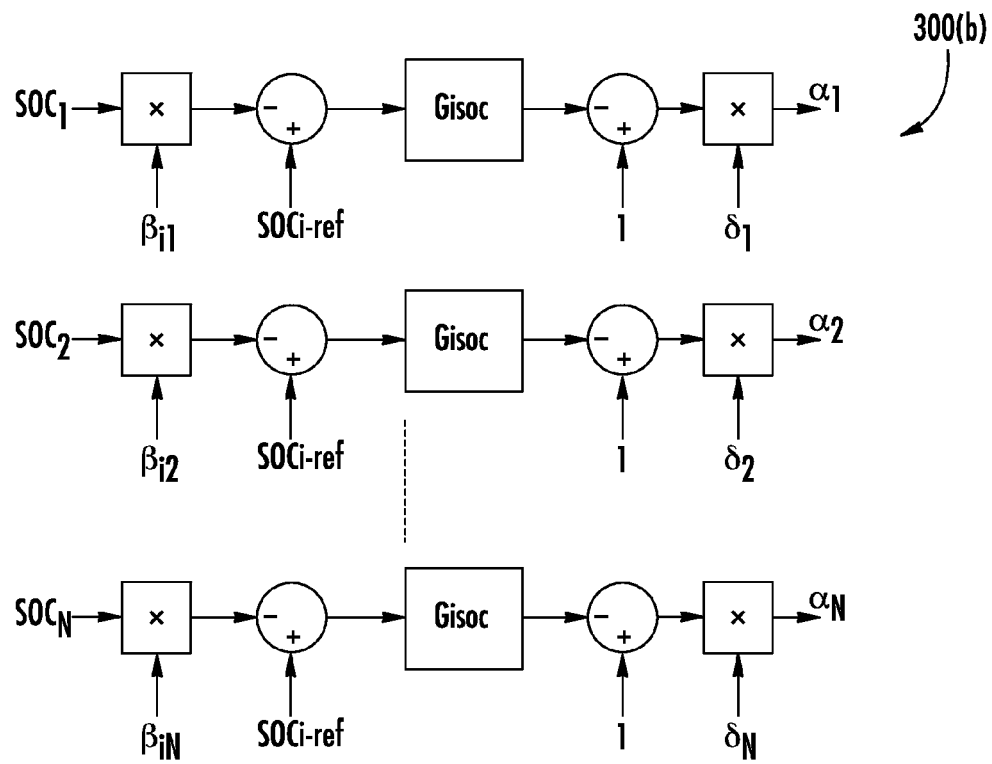

FIGS. 6-7 illustrate basic block diagrams of the CCCM controller 300(*a*) and 300(*b*) with cell SOC balancing during charging. The SOC balancing with CCCM illustrated in FIGS. 6-7 is similar to the operation of the system discharging operation with bus voltage regulation described above with regard to FIGS. 2-3, except that in this case the cell current (Icell1 . . . Icelln) is regulated rather than regulating the BMP output voltage V1 . . . VN.

A cell current reference value (Icell-all-ref) may be specified that is used to derive the initial reference currents for each BPM 104a . . . 104n (e.g., Icell1-ref through IcellN-ref). For example, Icell1-ref through IcellN-ref may be determined by dividing Icell-all-ref by a number of active battery cells 106a . . . 106n (or BPMs 104a . . . 104n) in the battery pack string. This number may be specified as Nactive, where Nactive=N when δ1=δ2= . . . =δN=1 because Nactive=(N−(1-δ1)−(1-δ2)− . . . −(1-δN)).

In accordance with the system of FIG. 6, the cell current is also the bus current to the rest of the system. These reference values are used in a closed control loop as shown in FIG. 7 in order to regulate the output current for each cell 106a . . . 106n. When the current loop multipliers αi1=αi2 . . . αiN=1, the output current of the BPMs (Icell1 through IcellN) are equal and their sum is equal to IPack=Icell-all-ref. The output of each BMP can be made different by making its multiplier value different, however, while keeping αi1+αi2+ . . . + αiN=Nactive such that IPack is always equal to Icell-all-ref. The controller compensation transfer function GiB(s) or GiB(z) in FIG. 6 can be a PI type or a PID type (P: Proportional, I: Integral, D: Derivative).

The current loop multiplier values αi1=αi2 . . . αiN output from 300(*b*) can be adjusted in order to control the cells SOC values (SOC1 through SOCN) as illustrated in FIG. 7. The SOC values of the cells are compared to a reference value (SOCi-ref) in order to maintain symmetric SOC values (naturally perform cell balancing) assuming that the SOH of all cells is the same. This SOC reference values is generated by adding all SOC values of the cells as shown in FIG. 7 when the SOC loop multipliers βi1=βi2= . . . =βiN=1, the Enable/Disable multipliers δ1=δ2= . . . =δN=1, and dividing the sum by the number of active cells, Nactive. Thus, a relationship may be defined, as follows:

$$SOCi\text{-}ref=(\beta i1\times\delta 1\times SOC1+\beta i2\times\delta 2\times SOC2+\ldots+\beta iN\times\delta N\times SOCN)/Nactive \quad (2)$$

If a cell SOC value is smaller or larger than the reference (i.e. the other cells' SOC values), this will affect its current loop multiplier value (αir, r=1, 2 . . . N). As shown in FIG. 6, because the current loop multiplier value is an input to a multiplier associated with each BPM, the current loop multiplier value will affect the reference current of that specific cell BPM. Because the output voltage of all BPMs 104a . . . 104n in the same string is the same, this difference in the current will affect the discharge or charge rate of that specific cell because a BPM output power in this case is a function of the BPM output voltage for the same current. This will continue until all cells SOC values are equal and the cells are balanced. Thus, adjusting the current of a BMP while maintaining the total battery pack current regulated provides a mechanism to control the energy drawn from any particular battery cell 106a . . . 106n, which controls the discharge or change rate of the cell. This control concept results in charge balance control, and therefore there is no need for additional balancing circuits to transfer charges between the cells. In FIG. 7, GiSOC can be a proportional type compensator (DC gain), such as a low pass filter.

The SOC loop multipliers, shown in 300(b) as βi1 ... βiN, may be used to control the desired SOC for a specific cell in order to make the SOC or discharge/charge rate of a cell or larger or smaller than the rest of the cells. Each SOC loop multiplier βi1 ... βiN may be 0 or 1 (or other positive value), which may be determined as a function of the cell SOH. If the multiplier value is larger, the control loop will behave as if the associated cell has higher SOC than actually it has, and therefore it will discharge the cell at slower rate, and vice versa. Additionally or optionally, the multiplier βi1 ... βiN may be used to prevent a cell voltage from going below a given limit during discharge if the voltage of that cell is decreasing at faster rate, or from going above a given limit during charge if the voltage of that cell is increasing at faster rate. Additionally or optionally, the multiplier βi1 ... βiN may be used to prevent a cell from excessive heating as part of a temperature control/thermal management scheme.

In accordance with some implementations, the multipliers δ1 through δN provided to 300(b) may have values of either 1 or 0 in order to enable or disable a BPM control. For example, BPM control may be disabled if a BPM is removed from the battery pack.

Figure 8:
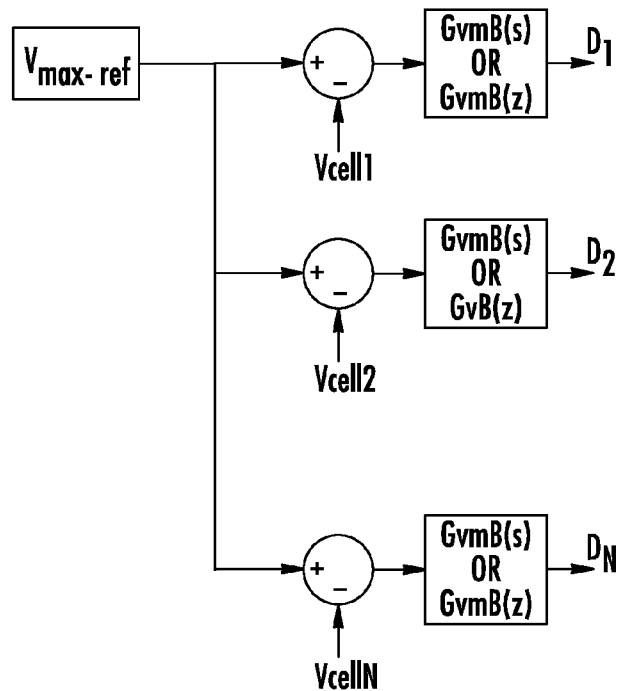
FIG. 8 illustrates a block diagram of a constant voltage charging mode State-Of-Charge (SOC) controller within the energy storage system of FIG. 1.

FIG. 8 illustrates the basic block diagram of the CVCM controller. All variables shown in FIG. 8 have the same definitions/properties as described above. Because the charging is controlled separately for each cell, each cell can be charged to its own maximum and/or optimum charge value. This means that the existence of a cell or more that have higher degradation than the other cells will not affect the charges (energy) that can be stored in the rest of the cells in order to avoid cells damage.

DC-DC Power Converter of the BPMs

In some implementations, the DC-DC power converter 108a ... 108n of each BPM is bidirectional in order to allow for both charging and discharging operations. The DC-DC power converter 108a ... 108n may be isolated when required. Several isolated and non-isolated topologies may be used in accordance with differing applications. The converter 108a ... 108n may operate in boost mode (voltage step-up mode) during a charging mode and in buck mode (voltage step-down mode) during a discharge mode. The selection of a particular power converter topology may be made as a function of variables, such as BMP desired power rating, target power conversion efficiency, size, cost, and integration simplicity.

Cell Impedance Estimation/Measurement Method for SOC and SOH

Figure 9:
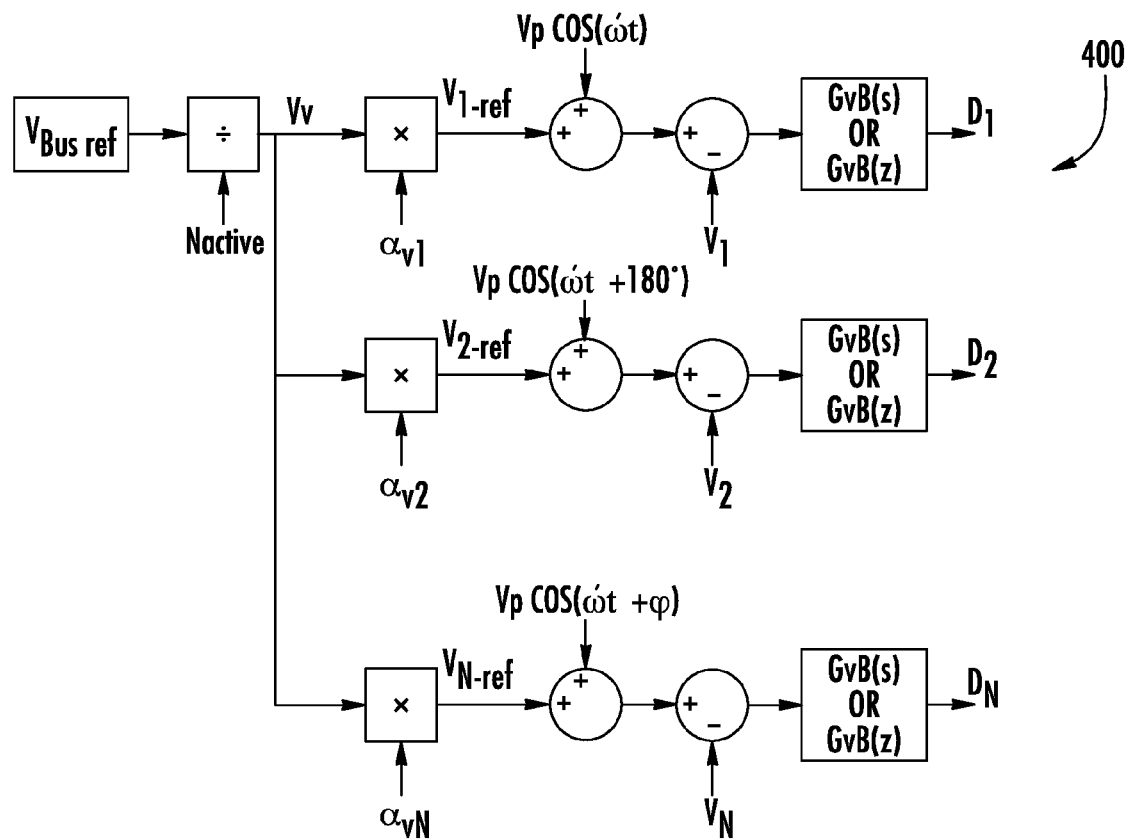
FIG. 9 illustrates a block diagram of a controller having a sinusoidal signal added to the controller for impedance measurement.

Estimating the cell battery impedance provides information that may be used for more accurate determination of SOC and early fault detection of a cell. In the system of FIG. 1, the impedance can be estimated real-time online during the system operation based on the AC Impedance Spectroscopy without interrupting the battery pack system operation. FIG. 9 illustrates a control system 400 to estimate the impedance in the system of FIG. 1 during the discharge operation. All variables shown in FIG. 9 have the same definitions/properties as described above. It is noted that a similar function can also be performed during a charging operation. In the system 400, a sinusoidal signal (Vp cos(ωt), Vp cos(ωt+180°)...Vp cos(ωt+θ)) having a given frequency (e.g., 1 kHz) is added to the reference voltage of each cell BPM such that the DC output voltage has a low frequency sinusoidal ripple with relatively small peak to peak value. It is noted that the added sinusoidal frequency may have a frequency between 1 Hz and 10 kHz. This will cause the voltage and the current of the battery cell to have sinusoidal ripple. Using Ohm's Law the impedance can be calculated as $|Z_r = \Delta V_{cellr-cos}/\Delta I_{cellr-cos}|$, where $\Delta V_{cellr-cos}$ is the sinusoidal peak to peak ripple of the battery cell voltage and $\Delta I_{cellr-cos}$ is the sinusoidal peak to peak ripple of the battery cell current. The impedance angle can be also found, if desired, by measuring the phase shift between the resulted sinusoidal voltage ripple and the sinusoidal current ripple.

In order to reduce or eliminate the effect of the added sinusoidal signal to the reference on the battery pack system output voltage, the sinusoidal signals added to the reference of each two cells may be shifted by 180°, as illustrated in FIG. 9, in order to achieve voltage ripple cancellation. This is because one cell output voltage will be at its maximum while the other cell output voltage will be at its minimum while their ripples vary sinusoidally, causing a cancellation that will result in an output voltage as if the sinusoidal reference signals were not added. This is because $$[V_{cell1-Dc} + V_p \cos(\omega t)] + [V_{cell1-Dc} + V_p \cos(\omega t + 180°)] = V_{cell1-DC} + V_{cell2-DC}, \quad (3)$$

since $V_{cell1-Dc} + V_p \cos(\omega t) + V_{cell1-Dc} + V_p \cos(\omega t + 180°) = 0$.

For complete sinusoidal ripple cancellation, the number of BPMs 104a ... 104n should be an even number. The method allows for online and continuous measurement of the battery cells impedance as temperature and SOC vary and as the cell ages. This is valid during both charge operation and discharge operation of the battery. Note that performing this function also did not require adding additional electronic circuits to apply the frequency perturbation to the cells; it is done by controlling the DC-DC converters 108a ... 108n.

Cells Open Circuit Voltages (OCV) Estimation for SOC and Early Fault Detection

As the cell impedance is measured real-time, this information can be used to estimate the battery cell Open Circuit Voltage (OCV), $V_{ocv-cellr}$ in real-time as follows: $V_{OCV-cellr} = V_{cellr} + |Z_r| \cdot I_{cellr}$. This OCV value can be used to indicate or estimate SOC. Since is not presumed and is measured in real-time (online measurement), this results in a more accurate $V_{OCV-cellr}$.

The real-time information of the impedance can also be used for early detection of faulty cells. This is based on the magnitude of the rate change of cell impedance over time and/or the direction of this change (increase/decrease) over time. The proposed controller should be able to give an indication signal (e.g. red LED light) that the cell is becoming faulty before the fault occurs.

Figure 10:
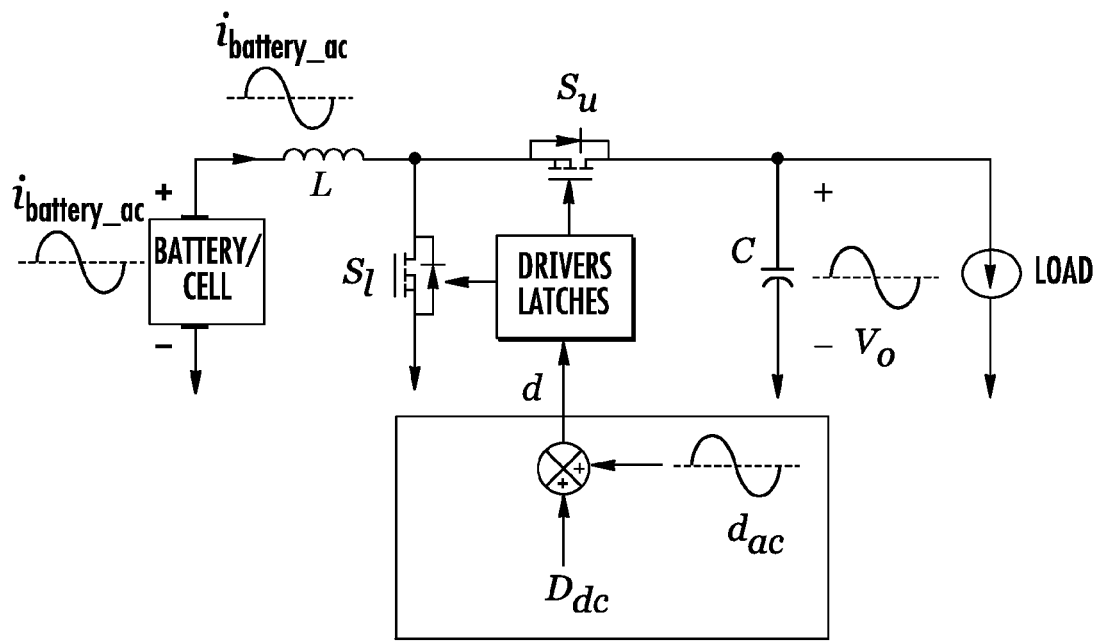
FIG. 10 illustrates an example DC-DC boost/buck converter.

A conventional non-isolated bidirectional DC-DC boost/buck converter, as shown in FIG. 10, is utilized for non-limiting illustration and validation purposes. This bidirectional DC-DC power converter operates as a boost converter during battery discharge mode in order to step up the voltage for the load and operates as a buck converter in battery charge mode to step down the voltage for the battery.

Figure 11:
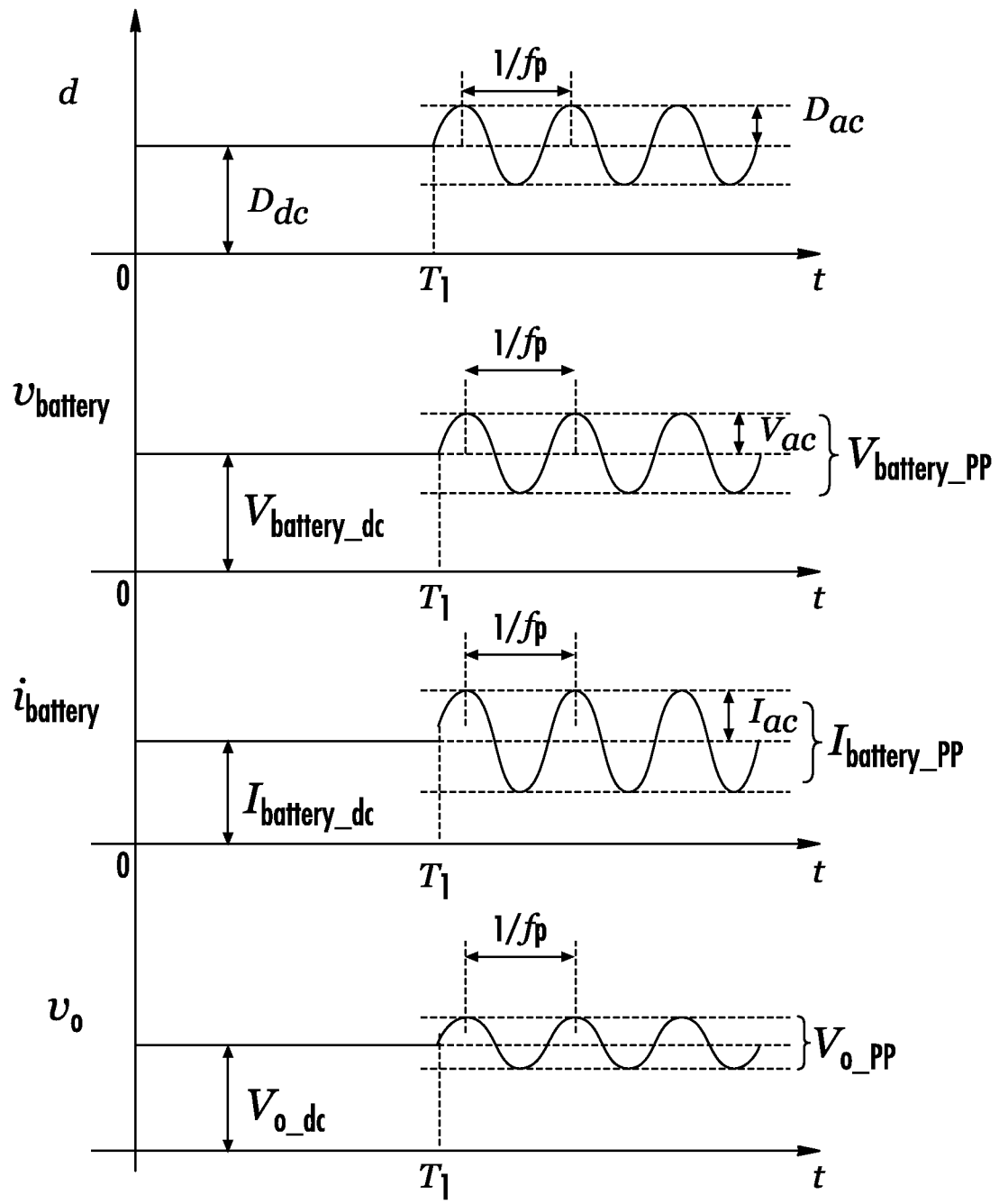
FIG. 11 illustrates operating waveforms of the DC-DC boost/buck converter of FIG. 10 during impedance measurement.

In order to supply a desired output voltage ($V_{o\_dc}$) in the steady state, the power converter has a DC duty cycle value ($D_{dc}$), as shown in FIG. 10. The corresponding DC battery voltage and DC battery current are $V_{battery\_dc}$ and $I_{battery\_dc}$, respectively as shown in FIG. 11. Once the impedance measurement mode is triggered in $T_1$, an additional small sinusoidal duty cycle perturbation signal ($d_{ac}$) at a frequency of interest ($f_p$) with a peak amplitude of $D_{ac}$ is added to $D_{dc}$, as illustrated in FIG. 11 and given by Equation (4). The perturbation frequency ($f_p$) is significantly lower than the switching frequency ($f_{sw}$) of the power converter. This small duty cycle perturbation will results in generating relatively small sinusoidal ripples superimposed over the power converter DC output voltage $V_{o\_dc}$, DC battery voltage $V_{battery\_dc}$ and DC battery current $I_{battery\_dc}$, as illustrated in FIG. 11 and given by Equation (5) and (6), where $V_{battery}$ is the battery voltage and $i_{battery}$ is the battery current. All of these sinusoidal ripples are with the perturbation frequency ($f_p$).

By measuring the peak to peak value of the battery voltage ($V_{battery-pp}$) and the battery current ($I_{battery-pp}$), the battery impedance magnitude value at the given perturbation frequency ($f_p$) can be determined based on Equation (7). When there is a phase shift between the battery voltage and current and/or phase information is needed, Equation (8) can be used to determine the phase of the battery impedance at $f_p$, where the $\phi_v$ is the phase of the battery voltage and $\phi_i$ is the phase of the battery current.

$$d(t)=D_{dc}+D_{ac}\cdot\sin(2\pi ft) \quad (4)$$

$$i_{battery}(t)=I_{battery\_dc}+I_{ac}\cdot\sin(2\pi ft+\phi_i) \quad (5)$$

$$v_{battery}(t)=V_{battery\_dc}+V_{ac}\cdot\sin(2\pi ft+\phi_v) \quad (6)$$

$$|z_{battery}|=V_{battery-pp}/I_{battery-pp} \quad (7)$$

$$\angle z_{battery}=\phi_v-\phi_i \quad (8)$$

Modularity and Scalability

Figure 14:
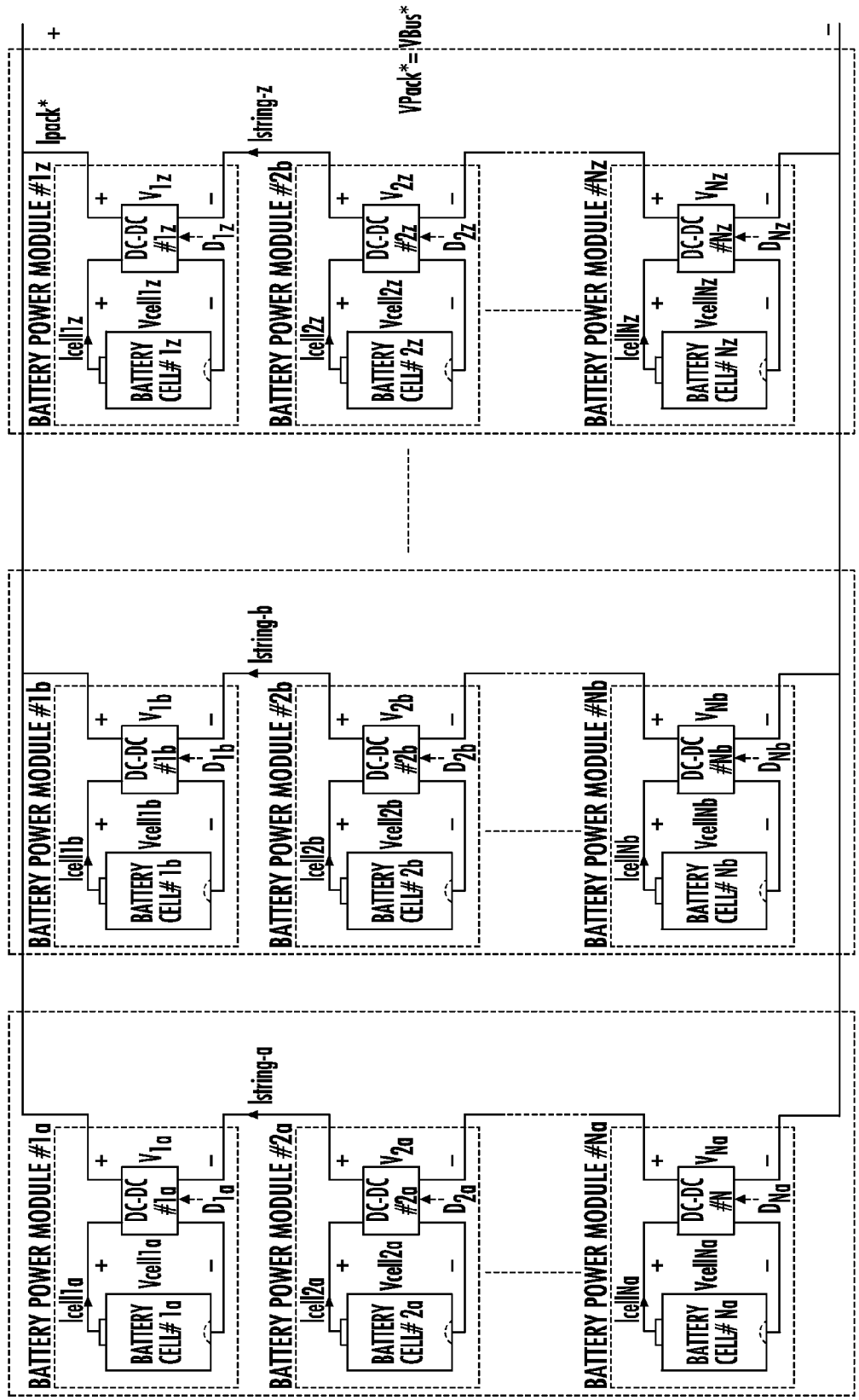

FIG. 14 illustrates an example distributed battery pack system. FIG. 14 illustrates a partial simplified diagram that is not to scale. The cells' BPMs are arranged in a modular manner and each cell BPM can be replaced or can be eliminated by shorting its terminals on the battery pack mother board. The figure also illustrates how the controller board could be connected to the battery pack mother board. As discussed earlier, each BPM has the duty cycle from the controller as an input and has the following as outputs to the controller: The output voltage, the cell voltage, and the cell current. The battery back current is also supplied to the controller which is similar to the output current of each BPM connected in series. Moreover, with reference to FIG. 2, it can be observed that adding more cells or removing cells from the system can be done by adding or removing more of the same branches in this controller (easily scalable and modular battery system). This may be similarly performed in the rest of the control diagrams shown in this proposal.

Adding Additional Cells in Series and in Parallel

Figure 13:
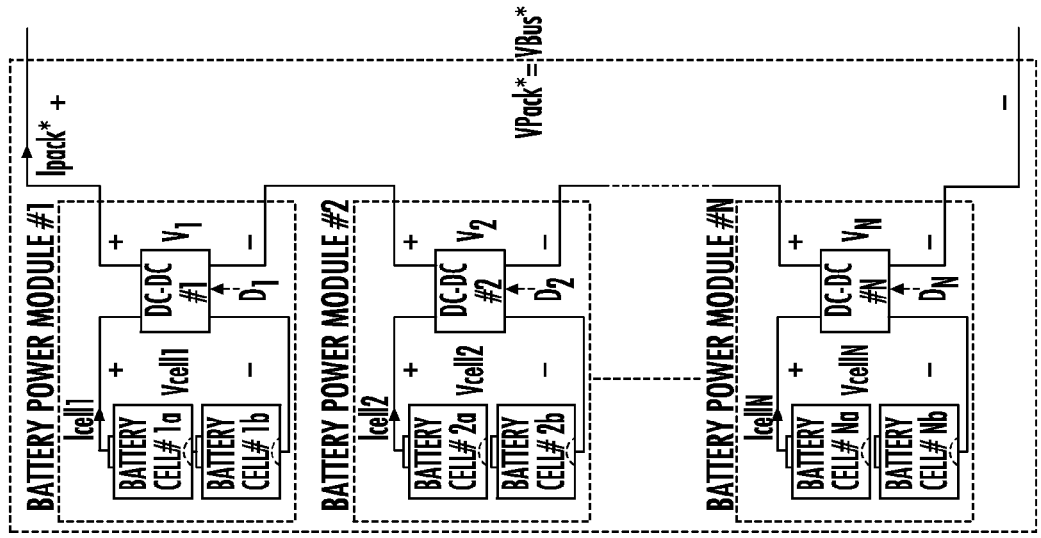
FIGS. 12-14 illustrate various configurations of Battery Power Modules (BPMs)
Figure 12:
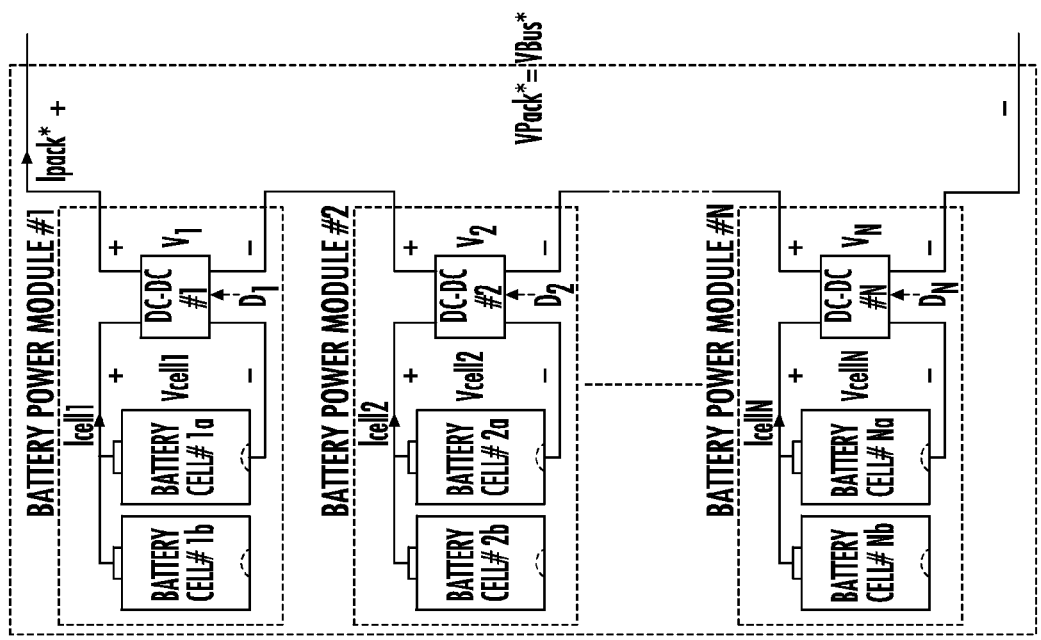

With reference to FIGS. 12-14, the following characteristics of the system design may be applicable: (1) The voltage of the back can be increased by adding more BPMs in series, by increasing the voltage gain of the BPMs' DC-DC power converters, or by both such that an optimized design in terms of size, cost, and reliability is achieved. (2) The battery pack capacity may be increased by using higher capacity cells of courses, by paralleling two or more cells in each BPM (see, e.g., FIG. 12, which illustrates only BPMs without a controller and other parts), or by paralleling strings of BPMs connected in series (see, e.g., FIG. 13, which illustrates only BPMs without a controller and other parts). (3) In order to reduce the number of BPMs and reduce cost, it possible have two or more cells connected in series per BPM with one DC-DC power converter (see, e.g., FIG. 14, which illustrates only BPMs without a controller and other parts). In this later case the cells within the same BMP will affect each other and they will have the same issues noted above with regard to conventional battery backs, but these issues will be contained within the BPM since the other cells are decoupled through their BPMs.

Thermal Management

In accordance with the present disclosure, the battery system 100 of FIG. 1 exhibits better thermal management than the conventional battery systems because the battery cells are not directly connected to each other and the BPMs arrangement allows for larger surface area and better airflow. In general, designers may use paralleled power converters because they provide better thermal management ability. Moreover, the control loops including the SOC balancing loop of the proposed battery pack system will result in less energy being drawn from the cell (or the BPM in general) that has higher impedance value. This means that to such a cell will be less loaded, which can reduce its thermal rise because of the higher energy loss as a result of its higher impedance.

Results

A simulation model in Matlab®/Simulink® using the proposed battery pack system architecture and control diagrams and concepts discussed above will now be introduced. In this simulation model, a Lithium Ion battery cell option was selected (6 Ah each cell). A four cell system was used as an example. The condition considered is as follows: (1) Each of the four cells has different impedance value of 10 mΩ, 20 mΩ, 30 mΩ and 40 mΩ respectively, and (2) the online impedance measurement mode is enabled. The online impedance measurement can be run periodically or continuously during the system operation.

Figure 15A:
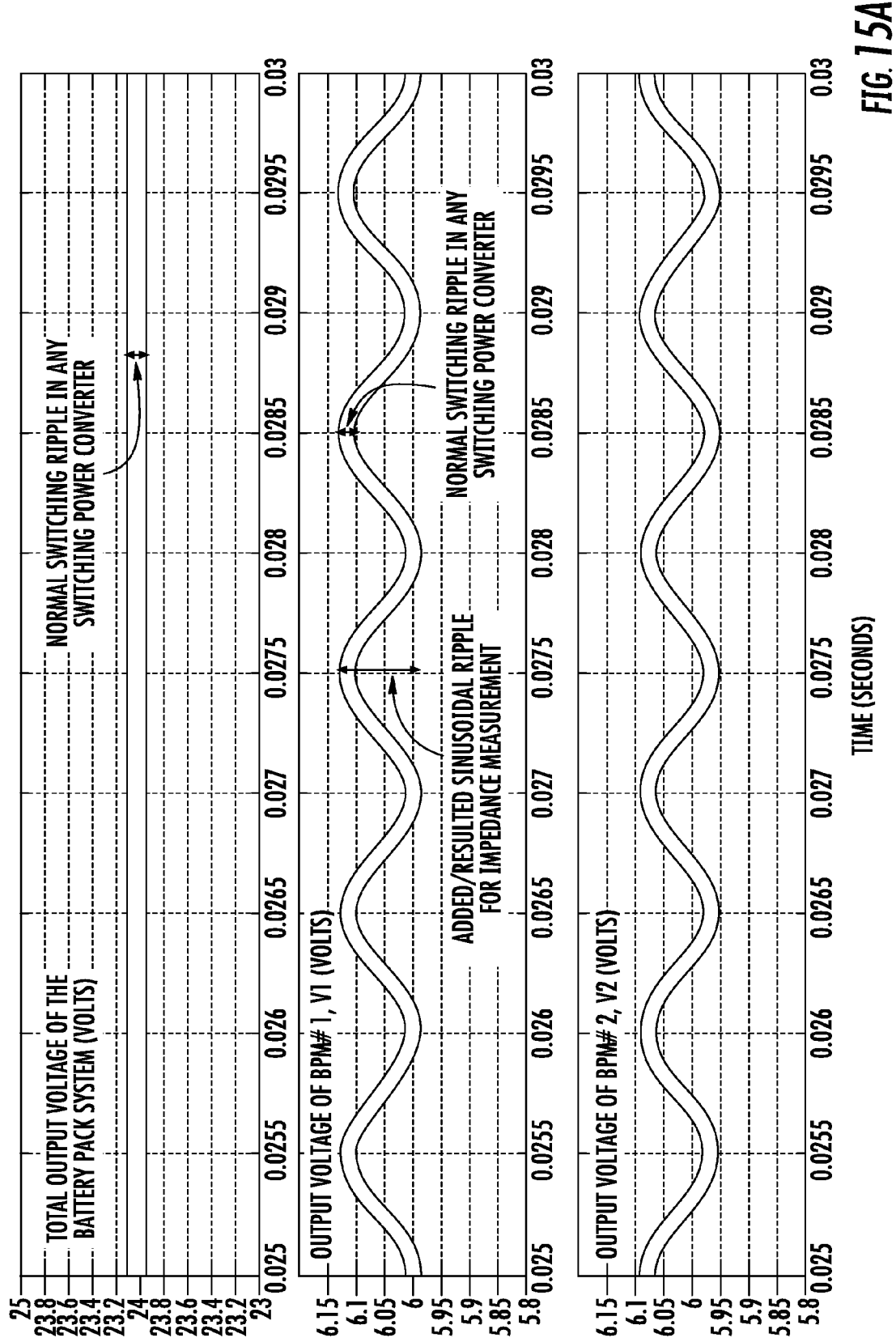
FIGS. 15-17 illustrate graphical results of simulation outputs of the BPMs of the present disclosure.
Figure 15B:
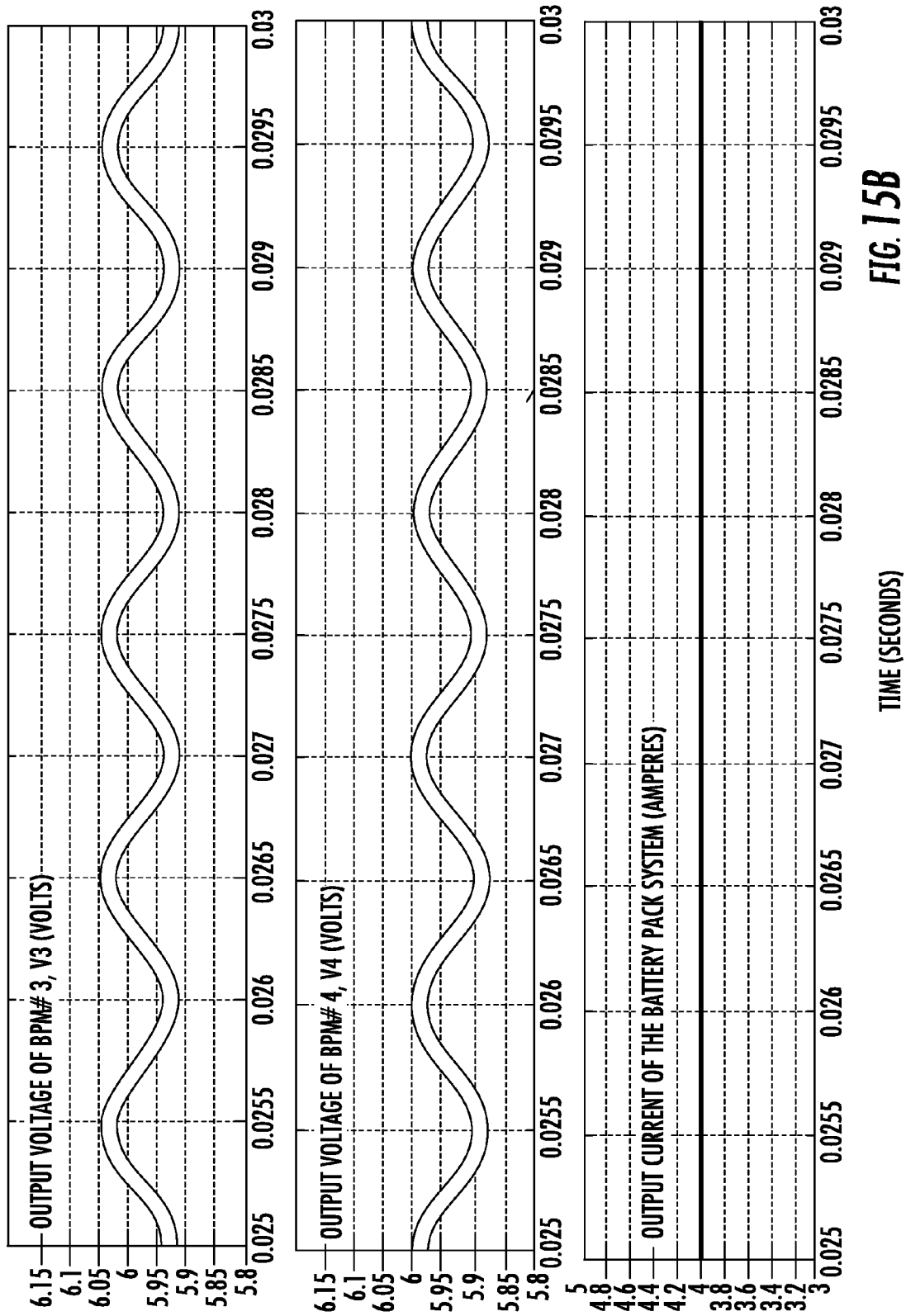

The voltage reference for this four cells/BPMs system was set to 24V and the load current is 4 A DC. FIG. 15 shows the total output voltage and current of the battery pack system and each of the four BPMs output voltage. It can be observed that the there is a sinusoidal ripple for each BPM output voltage around its DC value as a result of the duty cycle sinusoidal perturbation for impedance measurement. However, the total output voltage of the battery pack system does not have this ripple and it is pure DC (except for the small switching ripple which is normal in any switching power converter). This is because duty cycle sinusoidal perturbation is shifter by 180° for each cell, as discussed earlier in this proposal. The duty cycle sinusoidal perturbation frequency is 1 kHz (or as noted above, between 1 Hz and 10 kHz) which is significantly lower than the DC-DC power converters switching frequency of 500 kHz in this design example.

It can be shown that of the duty cycle sinusoidal perturbation is turned off, the output voltage of each BPM would also be a DC value with no sinusoidal ripple. It can also be observed that the DC value of each BPM output voltage is slightly different. This is expected if the controller performs well and the reason is because each cell has different impedance value and therefore different discharge (or charge) rate. In this case, the SOC balance control loop is able to detect that the cell with higher resistance is being discharged at faster rate (at the start of the operation) than the other cells and forced different output voltage for each BPM, while keeping the total output voltage regulated to 24V, such that SOC balance is maintained and all cells are discharged (or charged) at the same rate. As discussed earlier, that controller does this by naturally adjusting the values of the voltage control loop multipliers αv1 through αv4 generated by the SOC control loop.

Figure 16A:
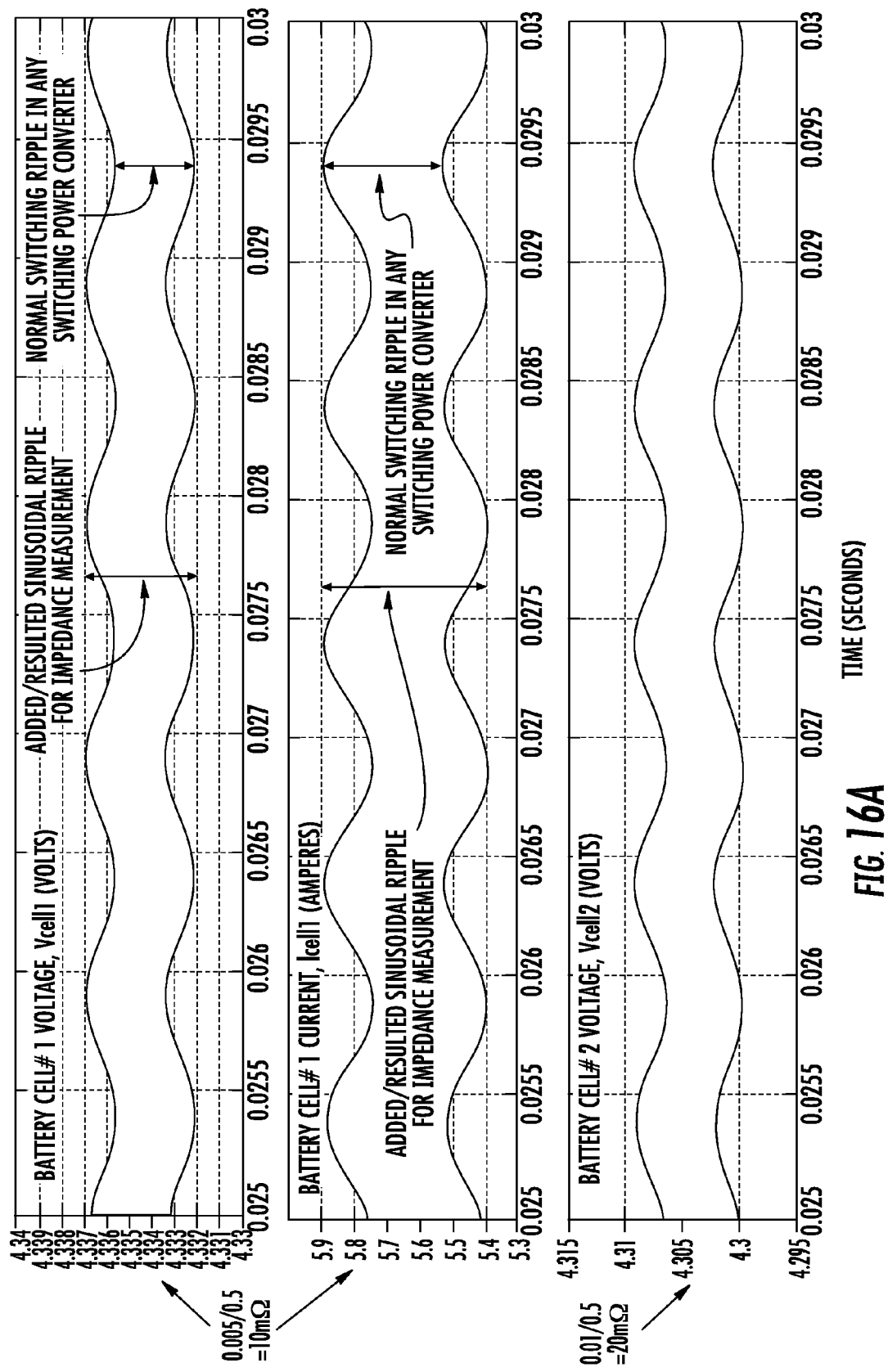
Figure 16B:
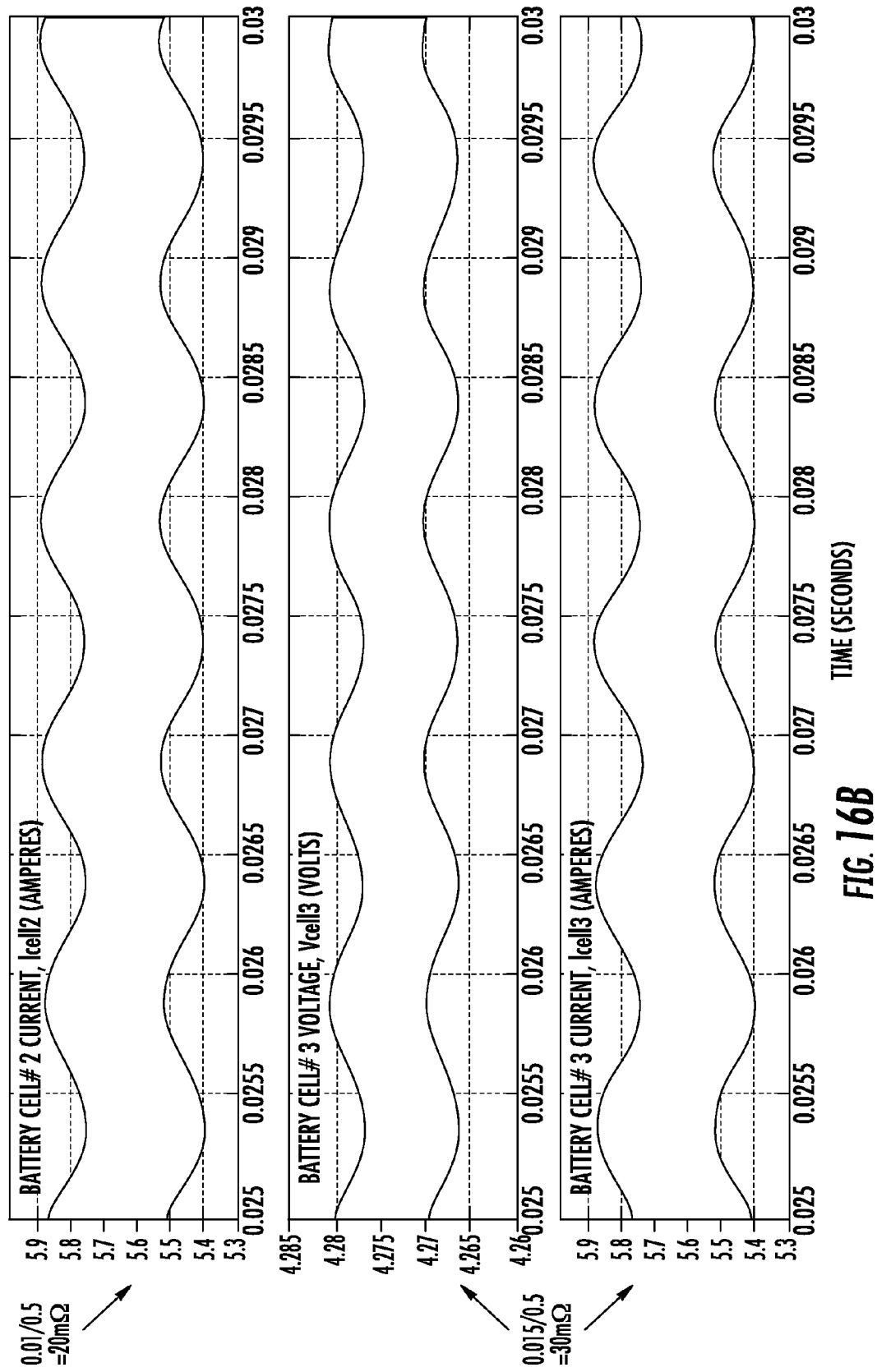
Figure 16C:
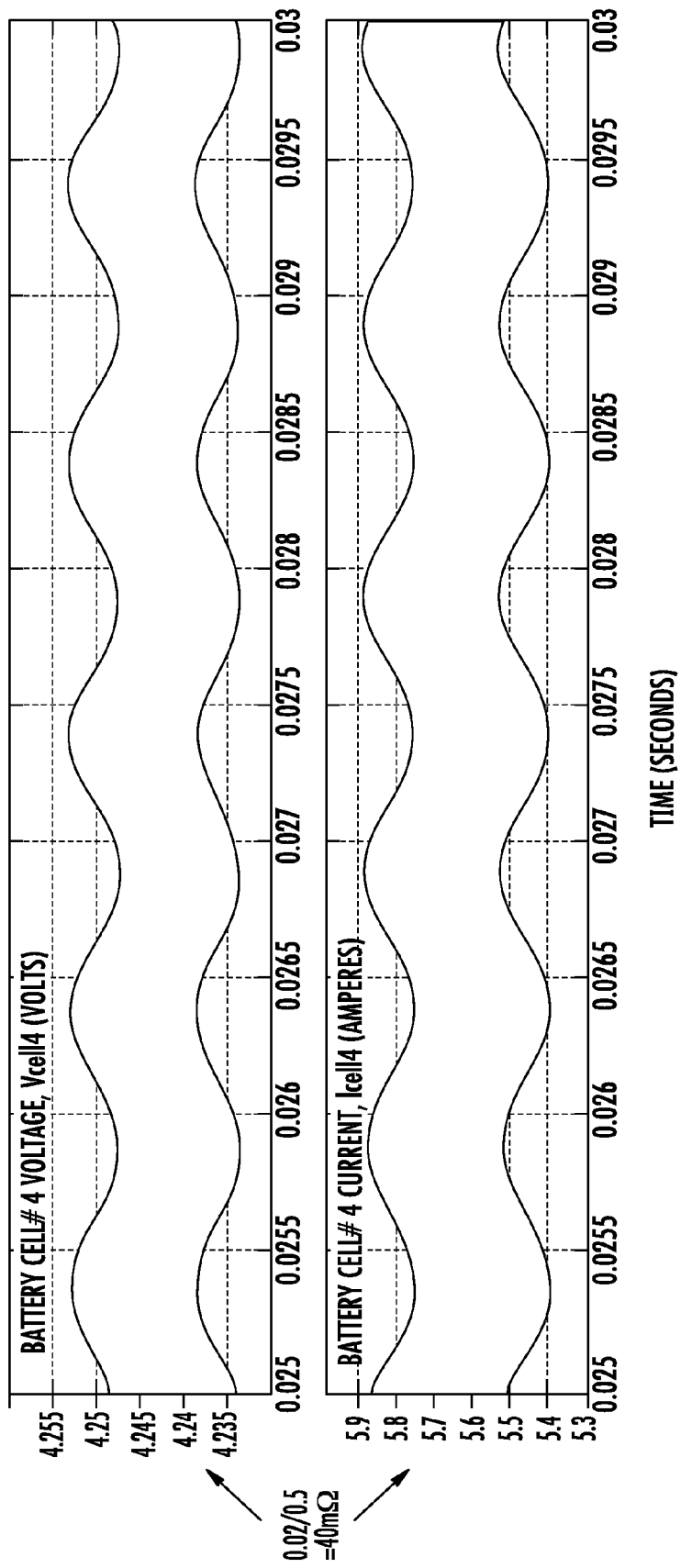

FIG. 16 shows each cell voltage and current. Again, as a result of the duty cycle sinusoidal perturbation for impedance measurement there is a sinusoidal ripple for each cell voltage and current around their DC value. The division of the sinusoidal voltage and current ripple values for each cell yields the expected cell impedance value, as depicted on FIG. 16. During the system operation, of the cells impedance values is charged, the proposed controller will be able to detect this such that more accurate SOC balance is achieved. Similar results are obtained under charging operation.

Figure 17:
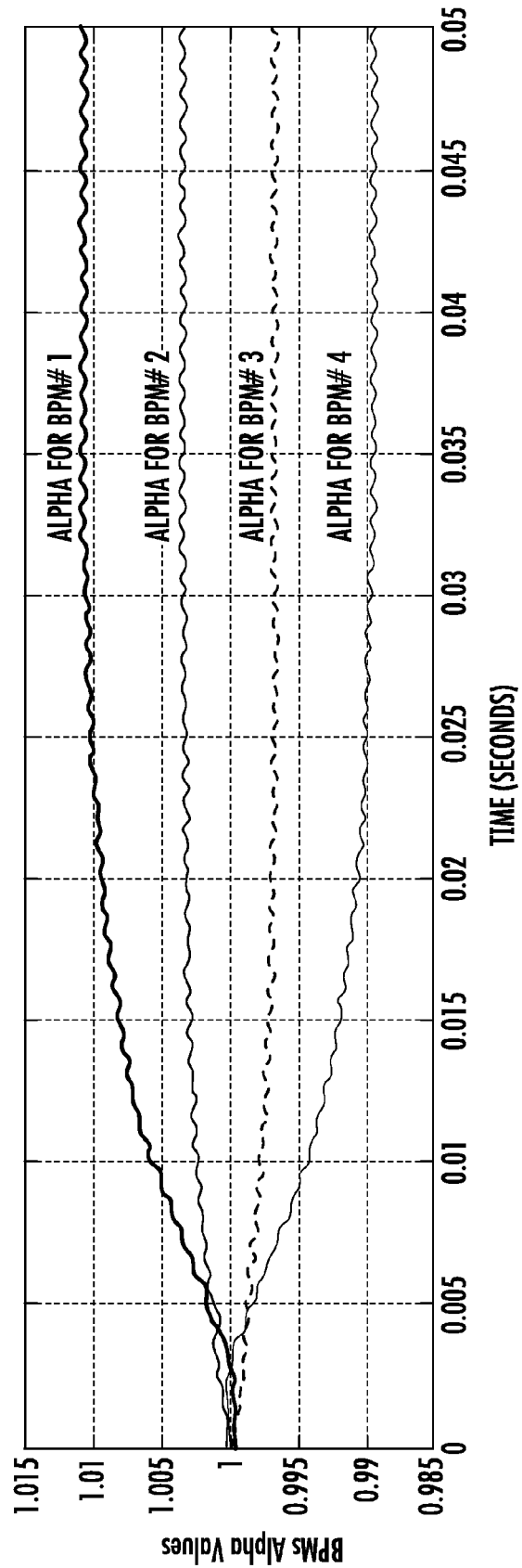

FIG. 17 shows the simulation results for αv1 through αv4, where their initial values are each set to 1. In the simulation, each of the cells has a different impedance value. As the cells start to discharge, the α values approached a steady state values such that SOC balance is maintained. Note that that sum of the α values is always equal to Nactive which is four in this case. The SOC was measured throughout the operation and confirmed to be always equal.

It should be noted that any of the executable instructions, such as those depicted functionally in the accompanying flowcharts, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of implementations of this disclosure can include embodying the functionality described in logic embodied in hardware or software-configured media.

It should also be noted that the flowcharts included herein show the architecture, functionality and/or operation of implementations that may be configured using software. In this regard, each block can be interpreted to represent a module, segment, or portion of code, which comprises one or more executable instructions for implementing the specified logical function(s). It should also be noted that in some alternative implementations, the functions noted in the blocks may occur out of the order depicted. For example, two blocks shown in succession may in fact be executed substantially concurrently or the blocks may sometimes be executed in the reverse order, depending upon the functionality involved.

It should be emphasized that the above-described implementations are merely possible examples of implementations set forth for a clear understanding of the principles of this disclosure. Many variations and modifications may be made to the above-described implementations without departing substantially from the spirit and principles of the disclosure. All such modifications and variations are intended to be included herein within the scope of this disclosure.

What is claimed is:

1. A battery pack, comprising:
a plurality of battery pack modules, each battery pack module comprising a battery cell and a power converter; and
a controller that regulates an output voltage of the battery pack by outputting a control signal to each power converter of each of the plurality of battery pack modules in accordance with each battery pack module's impedance as measured by adding a sinusoidal duty cycle perturbation signal ($d_{ac}$) at a frequency of interest ($f_p$) with a peak amplitude of $D_{ac}$, to a DC duty cycle ($D_{dc}$) of each power converter of each of the plurality of battery pack modules,
wherein a power converter of each of the plurality of battery pack modules are connected in series to form a string of N battery pack modules, wherein each battery pack module is independently controlled by the controller, and wherein the voltage across the N battery pack modules defines the output voltage of the battery pack.

2. The battery pack of claim 1, wherein a battery pack voltage reference value is determined by the controller in a constant voltage mode, wherein an initial voltage reference value for each battery pack module is determined by dividing the battery pack voltage reference value by a number of active battery pack modules in the battery pack, and wherein the initial voltage reference value for each battery pack module is used to regulate an output voltage of a respective battery pack module.

3. The battery pack of claim 2, wherein a voltage loop multiplier is specified by the controller for each battery pack module, and wherein the voltage loop multiplier is used to adjust a state of charge (SOC) of each battery pack module.

4. The battery pack of claim 3, wherein the voltage loop multiplier is determined by comparing the SOC of each battery pack module to a reference SOC value.

5. The battery pack of claim 4, wherein the reference SOC value is determined by adding the SOC of each battery pack module and dividing a total by the number of active battery pack modules.

6. The battery pack of claim 4, wherein a SOC multiplier is specified for each battery pack module to alter the charge rate or discharge rate of a respective battery pack module.

7. The battery pack of claim 2, wherein an estimate of an impedance of each of the battery pack modules is performed by add a sinusoidal signal to the initial voltage reference value for each battery pack module.

8. The battery pack of claim 7, wherein each sinusoidal signal applied to the initial voltage reference value for each battery pack module is shifted to cancel the sinusoidal signal in the output voltage.

9. The battery pack of claim 7, wherein the impedance is used by the controller to determine a state of charge (SOC) and/or state of health (SOH) of each cell and battery pack module.

10. The battery pack of claim 1, wherein a battery pack current reference value is determined by the controller in a constant current mode, wherein an initial current reference value for each battery pack module is determined by dividing the battery pack current reference value by a number of active battery pack modules in the battery pack, and wherein the initial current reference value for each battery pack module is used to regulate an output current of a respective battery pack module.

11. The battery pack of claim 10, wherein a current loop multiplier is specified by the controller for each battery pack module, and wherein the current loop multiplier is used to adjust a state of charge (SOC) of each battery pack module.

12. The battery pack of claim 11, wherein the current loop multiplier is determined by comparing the SOC of each battery pack module to a reference SOC value.

13. The battery pack of claim 12, wherein the reference SOC value is determined by adding the SOC of each battery pack module and dividing a total by the number of active battery pack modules.

14. The battery pack of claim 12, wherein a SOC multiplier is specified for each battery pack module to alter the charge rate or discharge rate of a respective battery pack module.

15. The battery pack of claim 1, wherein the controller operates in a constant current charging mode until a battery cell voltage reaches a maximum, and wherein the controller thereafter operates in a constant voltage charging mode until a battery cell current falls below a minimum value.

16. The battery pack of claim 1, wherein the power converter of each of the battery pack modules has the DC duty cycle value ($D_{dc}$) to produce a corresponding DC battery voltage $V_{battery\_dc}$ and DC battery current $I_{battery\_dc}$.

17. The battery pack of claim 16, wherein the perturbation frequency ($f_p$) is significantly lower than the switching frequency ($f_{sw}$) of the power converter to generate sinusoidal ripples superimposed over the power converter DC output voltage $V_{o\_dc}$, DC battery voltage $V_{battery\_dc}$ and DC battery current $I_{battery\_dc}$.

18. The battery pack of claim 16, wherein a peak-to-peak value of the battery voltage ($V_{battery\text{-}pp}$) and the battery current ($I_{battery\text{-}pp}$) is measured to determine a battery impedance magnitude value at the given perturbation frequency ($f_p$).

19. The battery pack of claim 18, wherein if there is a phase shift between the battery voltage and current and/or phase information, the following relationship is used to determine the phase of the battery impedance at $f_p$:

$$\angle z_{battery} = \phi_v - \phi_i$$

wherein $\phi_v$ is a phase of the battery voltage and $\phi_i$ is a phase of the battery current.

* * * * *